(12) United States Patent
Yan et al.

(10) Patent No.: US 7,945,130 B2
(45) Date of Patent: May 17, 2011

(54) MODE SCRAMBLING APPARATUS FOR MULTIMODE FIBER

(75) Inventors: Lianshan Yan, Monterey Park, CA (US); Lynn Lin, Diamond Bar, CA (US); Xiaojun Chen, San Gabriel, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 852 days.

(21) Appl. No.: 11/941,007

(22) Filed: Nov. 15, 2007

(65) Prior Publication Data

US 2010/0290738 A1    Nov. 18, 2010

(51) Int. Cl.
  *G02B 6/26* (2006.01)
(52) U.S. Cl. ............... 385/28; 385/1; 385/27; 385/31
(58) Field of Classification Search .......... 385/1, 2, 385/3, 8, 11, 15, 27, 28, 29, 31, 38, 13, 123
See application file for complete search history.

(56) References Cited

U.S. PATENT DOCUMENTS

| | | |
|---|---|---|
| 3,302,028 A | 1/1967 | Sterzer |
| 3,625,589 A | 12/1971 | Snitzer |
| 3,684,350 A | 8/1972 | Wentz |
| 3,719,414 A | 3/1973 | Wentz |
| 4,129,357 A | 12/1978 | Title |
| 4,158,506 A | 6/1979 | Collett |
| 4,341,442 A | 7/1982 | Johnson |
| 4,389,090 A | 6/1983 | LeFevre |
| 4,461,543 A | 7/1984 | McMahon |
| 4,478,494 A | 10/1984 | Soref |
| 4,685,773 A | 8/1987 | Carlsen et al. |
| 4,723,315 A | 2/1988 | Wetherell |
| 4,729,622 A | 3/1988 | Pavlath |
| 4,753,507 A | 6/1988 | DePaula et al. |
| 4,787,694 A | 11/1988 | Brambley et al. |
| 4,793,678 A | 12/1988 | Matsumoto et al. |
| 4,798,436 A | 1/1989 | Mortimore |
| 4,898,441 A | 2/1990 | Shimizu |
| 4,902,888 A | 2/1990 | Kondo |
| 4,917,452 A | 4/1990 | Liebowitz |
| 4,923,290 A | 5/1990 | Brinkmeyer et al. |
| 4,958,929 A | 9/1990 | Kondo |
| 4,960,319 A | 10/1990 | Dankowych |
| 4,966,431 A | 10/1990 | Heismann |
| 4,974,930 A | 12/1990 | Blyler, Jr. et al. |

(Continued)

FOREIGN PATENT DOCUMENTS

JP    61-102622    5/1986

(Continued)

OTHER PUBLICATIONS

Alferness R., "Electrooptic Guided-Wave Device for General Polarization Transformations," *IEEE Journal of Quantum Electronics*, QE-17(6):965-969, Jun. 1981.

(Continued)

*Primary Examiner* — Brian M Healy
(74) *Attorney, Agent, or Firm* — Perkins Coie LLP

(57) ABSTRACT

Apparatus and methods for scrambling optical modes in multimode fibers to achieve uniform light distribution in guided multi-mode light for various applications.

20 Claims, 14 Drawing Sheets

U.S. PATENT DOCUMENTS

| | | |
|---|---|---|
| 4,979,235 A | 12/1990 | Rumbaugh et al. |
| 4,988,169 A | 1/1991 | Walker |
| 5,004,312 A | 4/1991 | Shimizu |
| 5,081,348 A | 1/1992 | Siddiqui |
| 5,111,321 A | 5/1992 | Patel |
| 5,191,387 A | 3/1993 | Ichikawa et al. |
| 5,212,743 A | 5/1993 | Heismann |
| 5,243,455 A | 9/1993 | Johnson et al. |
| 5,247,176 A | 9/1993 | Goldstein |
| 5,251,057 A | 10/1993 | Guerin et al. |
| 5,285,507 A | 2/1994 | Van der Tol |
| 5,288,995 A | 2/1994 | Strachan |
| 5,317,445 A | 5/1994 | DeJule et al. |
| 5,373,393 A | 12/1994 | DeJule et al. |
| 5,381,250 A | 1/1995 | Meadows |
| 5,473,457 A | 12/1995 | Ono |
| 5,475,525 A | 12/1995 | Tournois et al. |
| 5,502,708 A | 3/1996 | Morimoto |
| 5,561,726 A | 10/1996 | Yao |
| 5,675,415 A | 10/1997 | Akatsu et al. |
| 5,723,856 A | 3/1998 | Yao et al. |
| 5,740,288 A | 4/1998 | Pan |
| 5,751,747 A | 5/1998 | Lutes et al. |
| 5,771,120 A | 6/1998 | Bergmann |
| 5,777,778 A | 7/1998 | Yao |
| 5,796,510 A | 8/1998 | Yao |
| 5,892,866 A | 4/1999 | Bristow et al. |
| 5,903,684 A | 5/1999 | Payton |
| 5,917,179 A | 6/1999 | Yao |
| 5,929,430 A | 7/1999 | Yao et al. |
| 5,963,291 A | 10/1999 | Wu et al. |
| 5,978,125 A | 11/1999 | Yao |
| 6,043,887 A | 3/2000 | Allard et al. |
| 6,075,647 A | 6/2000 | Braun et al. |
| 6,081,367 A | 6/2000 | Yokoyama et al. |
| 6,100,944 A | 8/2000 | Sharp et al. |
| 6,144,450 A | 11/2000 | Jopson et al. |
| 6,166,845 A | 12/2000 | Ito et al. |
| 6,175,412 B1 | 1/2001 | Drevillon et al. |
| 6,177,995 B1 | 1/2001 | Compain et al. |
| 6,178,036 B1 | 1/2001 | Yao |
| 6,211,957 B1 | 4/2001 | Erdogan et al. |
| 6,240,220 B1 | 5/2001 | Pan et al. |
| 6,275,312 B1 | 8/2001 | Derks et al. |
| 6,370,285 B1 | 4/2002 | Naganuma |
| 6,370,286 B1 | 4/2002 | Krol et al. |
| 6,373,614 B1 | 4/2002 | Miller |
| 6,384,916 B1 | 5/2002 | Furtak |
| 6,389,197 B1 | 5/2002 | Ilchenko et al. |
| 6,396,994 B1 | 5/2002 | Philipson et al. |
| 6,417,957 B1 | 7/2002 | Yao |
| 6,473,218 B1 | 10/2002 | Maleki et al. |
| 6,476,959 B2 | 11/2002 | Yao |
| 6,480,637 B1 | 11/2002 | Yao |
| 6,487,233 B2 | 11/2002 | Maleki et al. |
| 6,487,336 B1 | 11/2002 | Yao |
| 6,488,861 B2 | 12/2002 | Iltchenko et al. |
| 6,493,473 B1 | 12/2002 | Wooten |
| 6,493,474 B1 | 12/2002 | Yao |
| 6,498,869 B1 | 12/2002 | Yao |
| 6,498,891 B1 | 12/2002 | Montesanto et al. |
| 6,535,328 B2 | 3/2003 | Yao |
| 6,556,732 B1 | 4/2003 | Chowdhury et al. |
| 6,567,436 B1 | 5/2003 | Yao et al. |
| 6,576,886 B1 | 6/2003 | Yao |
| 6,580,532 B1 | 6/2003 | Yao et al. |
| 6,594,061 B2 | 7/2003 | Huang et al. |
| 6,628,850 B1 | 9/2003 | Yao |
| 6,628,861 B1 | 9/2003 | Yao |
| 6,628,862 B1 | 9/2003 | Yao |
| 6,661,941 B1 | 12/2003 | Yao |
| 6,687,423 B1 | 2/2004 | Yao |
| 6,707,977 B2 | 3/2004 | Chien et al. |
| 6,717,706 B2 | 4/2004 | Miller et al. |
| 6,735,016 B1 | 5/2004 | Mao et al. |
| 6,754,404 B2 | 6/2004 | Yao |
| 6,782,211 B1 | 8/2004 | Core |
| 6,795,481 B2 | 9/2004 | Maleki et al. |
| 6,795,616 B2 | 9/2004 | Yao |
| 6,836,327 B1 | 12/2004 | Yao |
| 6,847,453 B2 | 1/2005 | Bush |
| 6,873,631 B2 | 3/2005 | Yao et al. |
| 6,873,783 B1 | 3/2005 | Yao |
| RE38,735 E | 5/2005 | Yao |
| 6,937,798 B1 | 8/2005 | Yao et al. |
| RE38,809 E | 10/2005 | Yao |
| 6,975,454 B1 | 12/2005 | Yan et al. |
| 7,027,198 B2 | 4/2006 | Yao |
| 7,043,122 B2 | 5/2006 | Han et al. |
| 7,067,795 B1 | 6/2006 | Yan et al. |
| 7,154,659 B1 | 12/2006 | Yao et al. |
| 7,157,687 B1 | 1/2007 | Yao |
| 7,218,436 B2 | 5/2007 | Yao |
| 7,227,686 B1 | 6/2007 | Yan et al. |
| 7,233,720 B2 | 6/2007 | Yao |
| 7,265,836 B1 | 9/2007 | Yao |
| 7,265,837 B1 | 9/2007 | Yao |
| 7,343,100 B2 | 3/2008 | Yao |
| 7,372,568 B1 | 5/2008 | Yao |
| 7,382,962 B1 | 6/2008 | Yao |
| 7,391,977 B2 | 6/2008 | Yao |
| 7,436,569 B2 | 10/2008 | Yao et al. |
| 7,466,471 B2 | 12/2008 | Yao |
| 7,522,785 B2 | 4/2009 | Yao |
| 7,534,990 B2 | 5/2009 | Yao |
| 7,535,639 B2 | 5/2009 | Yao et al. |
| 2003/0081874 A1 | 5/2003 | Yao |
| 2004/0037495 A1 | 2/2004 | Yao |
| 2005/0041922 A1 | 2/2005 | Yao |
| 2005/0168659 A1 | 8/2005 | Melton |
| 2005/0200941 A1 | 9/2005 | Yao |
| 2005/0201751 A1 | 9/2005 | Yao |
| 2005/0265728 A1 | 12/2005 | Yao |
| 2006/0023987 A1 | 2/2006 | Yao |
| 2006/0115199 A1 | 6/2006 | Yao |
| 2007/0223078 A1 | 9/2007 | Yao et al. |
| 2007/0297054 A1 | 12/2007 | Yao et al. |
| 2008/0030839 A1 | 2/2008 | Yao |
| 2008/0054160 A1 | 3/2008 | Yao |
| 2008/0138070 A1 | 6/2008 | Yan et al. |
| 2008/0159692 A1 | 7/2008 | Yao |
| 2010/0290738 A1* | 11/2010 | Yan et al. ............ 385/28 |

FOREIGN PATENT DOCUMENTS

JP          05-323243          12/1993

OTHER PUBLICATIONS

Arrue, J. et al., "Design of Mode Scramblers for Step-Index and Graded-Index Plastic Optical Fibers," *Journal of Lightwave Technology*, 23(3):1253-1260, Mar. 2005.

Azzam, R.M.A., "In-line light-saving photopolarimeter and its fiber-optic analog," *Optics Letters*, 12(8):558-560, Aug. 1987.

Bouzid, A., et al., "Fiber-optic four-detector polarimeter," *Optics Communications*, 118(3-4):329-334, Jul. 1995.

Chen, Y.-T., et al., "Identification of Cancer/Testis-Antigen Genes by Massively Parallel Signature Sequencing," *Proc. Natl. Acad. Sci. USA (PNAS)*, 102(22):7940-7945, May 2005.

Granestrand, P., et al., "Active Stabilization of Polarisation on a Single-Mode Fibre," *Electronics Letters*, 20(9):365-366, Apr. 1984.

Johnson, M., "In-Line Fiber-Optical Polarization Transformer," *Applied Optics*, 18(9):1288-1289, May 1979.

Kaminow, I., "Polarization in Optical Fibers," *IEEE Journal of Quantum Electronics*, QE-17(1):15-22, Jan. 1981.

Lefevre, H.C., "Single-Mode Fiber Fractional Wave Devices and Polarisation Controllers," *Electronics Letters*, 16(20):778-780, Sep. 1980.

Mehta, A.D., et al., "Detection of Single-Molecule Interactions Using Correlated Thermal Diffusion," *Proc. Natl. Acad. Sci. USA (PNAS)*, 94(15):7927-7931, Jul. 1997.

Monerie, M., "Polarization-Maintaining Single-Mode Fiber Cables: Influence of Joins," *Applied Optics*, 20(14):2400-2406, Jul. 1981.

Monerie, M., et al., "Polarization Mode Coupling in Long Single-Mode Fibres," *Optical and Quantum Electronics*, 12(6):449-461, Nov. 1980.

Noda, J., et al., "Polarization-Maintaining Fibers and Their Applications," *Journal of Lightwave Technology*, LT-4(8):1071-1089, Aug. 1986.

Noe, R., "Endless Polarisation Control in Coherent Optical Communications," *Electronics Letters*, 22(15):772-773, Jul. 1986.

Noe, R., et al., "Endless Polarization Control Systems for Coherent Optics," *Journal of Lightwave Technology*, 6(7):1199-1207, Jul. 1988.

Okoshi, T., "Polarization-State Control Schemes for Heterodyne or Homodyne Optical Fiber Communications," *Journal of Lightwave Technology*, LT-3(6):1232-1237, Dec. 1985.

Okoshi, T., "Recent Advances in Coherent Optical Fiber Communication Systems," *Journal of Lightwave Technology*, LT-5(1):44-52, Jan. 1987.

Sakai, J., et al., "Birefringence and Polarization Characteristics of Single-Mode Optical Fibers under Elastic Deformations," *IEEE Journal of Quantum Electronics*, QE-17(6):1041-1051, Jun. 1981.

Schlager, J.B., et al., "Annealed Optical Fibre Mode Scrambler," *Electronics Letters*, 37(1):9-10, Jan. 2001.

Scholl, B., et al., "In-line fiber optic polarimeter with a 99% coupler," *Optical Engineering*, 34(6):1669-1672, Jun. 1995.

Shimizu, H., et al., "Highly Practical Fiber Squeezer Polarization Controller," *Journal of Lightwave Technology*, 9(10):1217-1224, Oct. 1991.

Smith, A.M., "Birefringence Induced by Bends and Twists in Single-Mode Optical Fiber," *Applied Optics*, 19(15):2606-2611, Aug. 1980.

Smith, A.M., "Single-Mode Fibre Pressure Sensitivity," *Electronics Letters*, 16(20):773-774, Sep. 1980.

Sobiski, D., et al., "Fast first-order PMD compensation with low insertion loss for 10Gbit/s system," *Electronics Letters*, 37(1):46-48, Jan. 2001.

Stolovitzky, G.A., et al., "Statistical analysis of MPSS measurements: Application to the study of LPS-activated macrophage gene expression," *Proc. Natl. Acad. Sci. USA (PNAS)*, 102(5):1402-1407, Feb. 2005.

Su, C.B., "Achieving variation of the optical path length by a few millimeters at millisecond rates for imaging of turbid media and optical interferometry: a new technique," *Optics Letters*, 22(10):665-667, May 1997.

Tearney, G.J., et al., "High speed phase- and group-delay scanning with a grating-based phase control delay line," *Optics Letters*, 22(23):1811-1813, Dec. 1997.

Tearney, G.J., et al., "Rapid Acquisition of in vivo Biological Images by Use of Optical Coherence Tomography," *Optics Letters*, 21(17):1408-1410, Sep. 1996.

Ulrich, R., et al., "Polarization optics of twisted single-mode fibers," *Applied Optics*, 18(13):2241-2251, Jul. 1979.

Westbrook, P.S., et al., "In-Line Polarimeter Using Blazed Fiber Gratings," *IEEE Photonics Technology Letters*, 12(10):1352-1354, Oct. 2000.

White, I.H., et al., "Optical Local Area Networking Using CWDM," *Proc. SPIE Waveguides and Networking*, vol. 5248, pp. 284-293, Dec. 2003.

Yang, W., et al., "Rapid ultrafine-tunable optical delay line at the 1.55-μm wavelength," *Optics Letters*, 23(23):1843-1845, Dec. 1998.

Yasa, Z.A., et al., "A Rapid-Scanning Autocorrelation Scheme for Continuous Monitoring of Picosecond Laser Pulses," *Optics Communications*, 36(5):406-408, Mar. 1981.

* cited by examiner

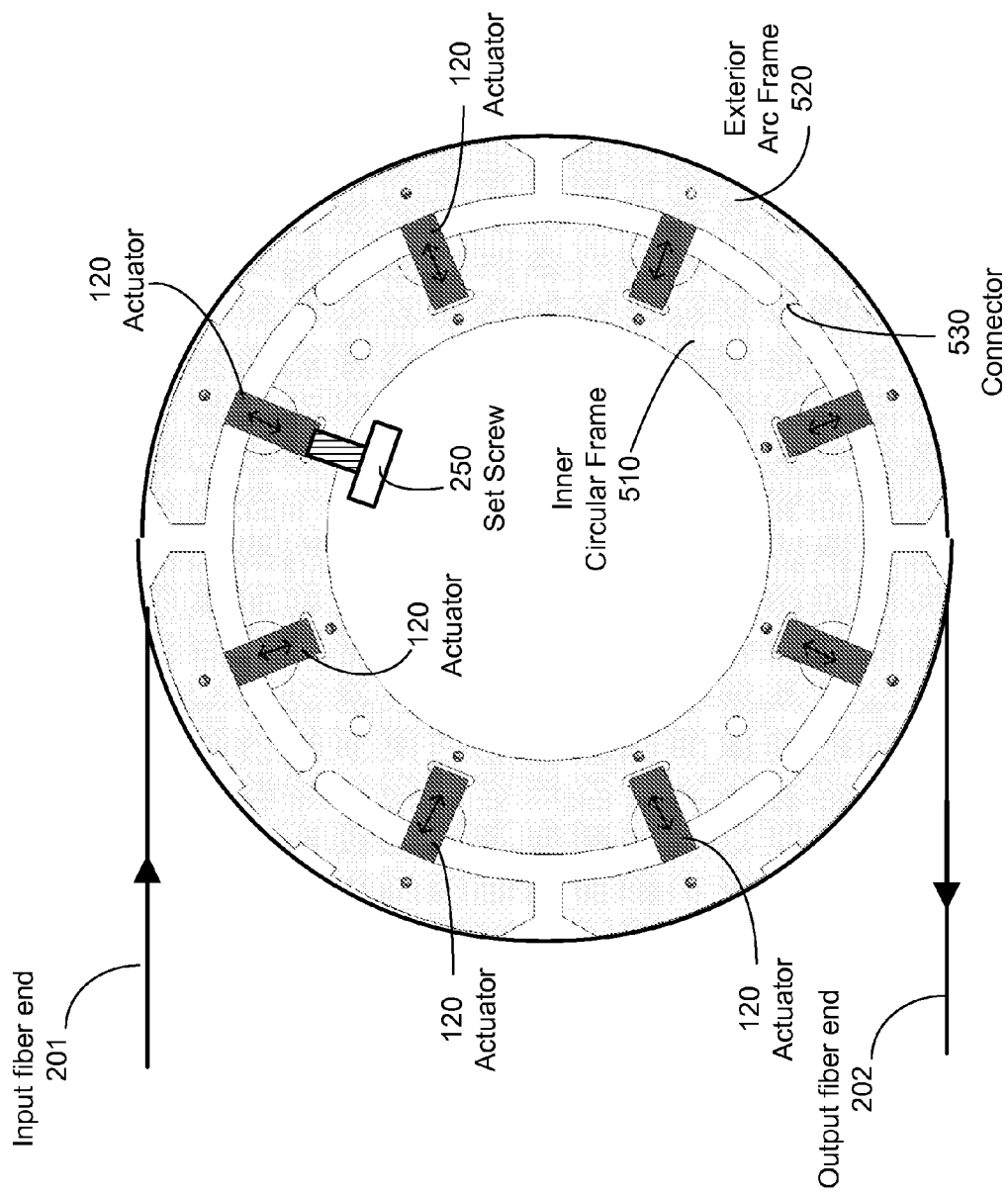

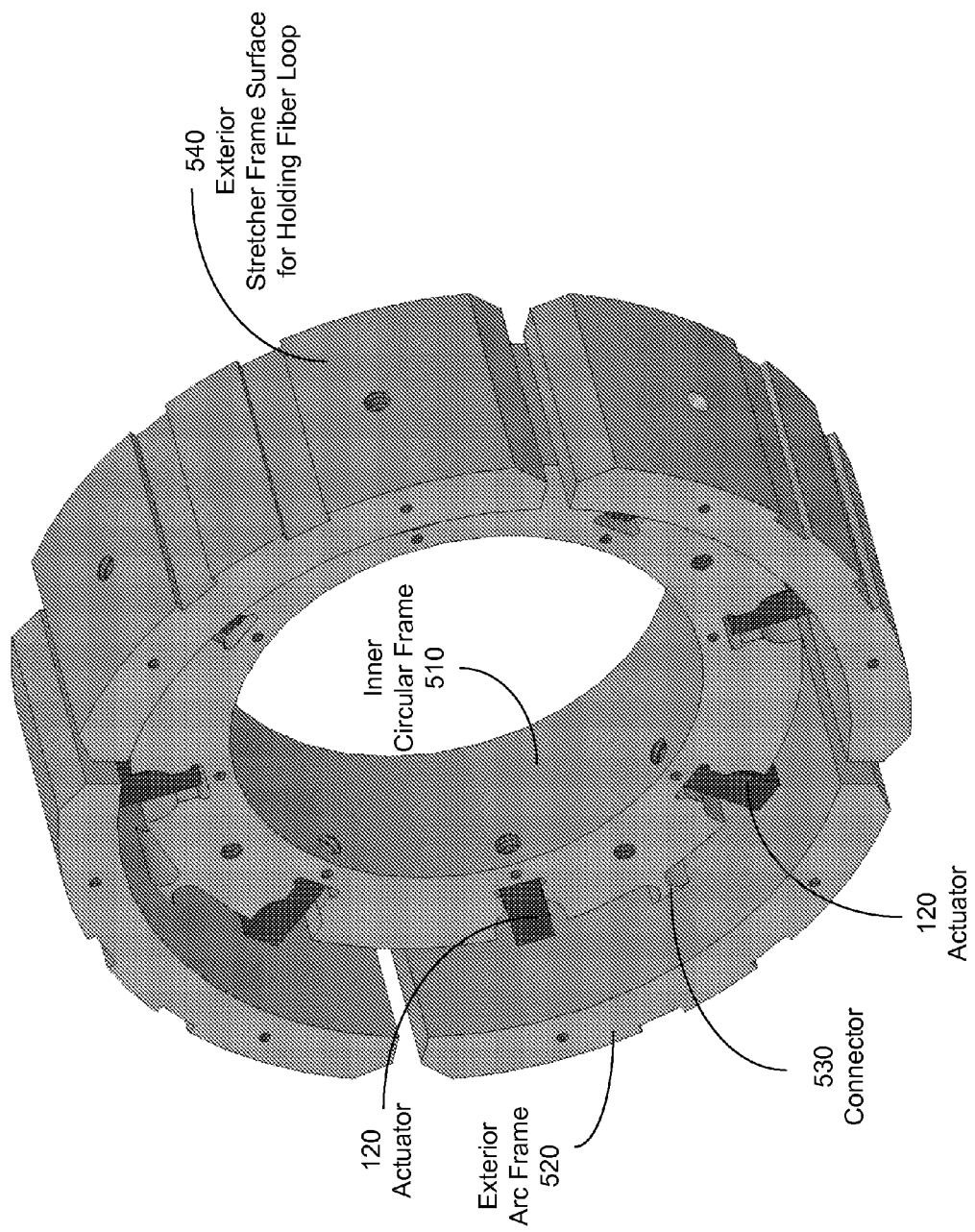

MODE SCRAMBLING APPARATUS FOR MULTIMODE FIBER

TECHNICAL FIELD

This application relates to fibers and fiber devices.

BACKGROUND

Optical fibers are optical waveguides and are used to guide light. Optical fibers can be single-mode fibers that support only one traverse waveguide mode or multi-mode fibers that support two or more traverse modes. A multimode fiber (MMF) can be used to direct light in multiple modes for various applications such as applications requiring guiding light at high optical power levels.

Some applications require a spatially uniform distribution of light over the cross section of a multimode fiber. Examples of such applications include, illumination devices in lighting applications, optical local-area-networks (LANs) over MMF and image encryptions, fiber-based genetic analysis and functional genomics such as Massively Parallel Signature Sequencing (MPSS) and molecular interactions.

Mode scrambling has been a well-known technique to improve the uniformity in multi-mode fibers, different approaches have been demonstrated: (i) the modification of multi-mode fiber itself, such as through extremely high temperature annealing, or special fabrication procedure in the cladding; (ii) twisting plastic optical fiber instead of traditional MMF; (iii) selecting one special mode through mode coupling. These approaches can suffer from one or more disadvantages such as uncertainty or extreme requirements during manufacturing, increased cost of fiber, considerable optical loss caused by various factors in these techniques.

SUMMARY

Implementations and examples are provided for apparatus and methods for scrambling optical modes in multimode fibers to achieve uniform light distribution in guided multi-mode light for various applications. The described apparatus and methods can be used to provide practical solutions with a longer life time and reliable performance for a mode scrambling device engaged to a multimode fiber.

In one aspect, an example for a multimode optical fiber device includes a multimode fiber that supports light in two or more optical waveguide modes; and fiber squeezers engaged to the multimode fiber at different locations along a lengthwise direction of the multimode fiber to squeeze the multimode fiber along two or more different squeezing directions perpendicular to the lengthwise direction. The fiber squeezers are responsive to respective control signals to modulate a degree of squeezing at selected squeezing frequencies, respectively, to cause mixing of light in the two or more optical waveguide modes inside the multimode fiber to increase a spatial uniformity of optical power across a cross section of the multimode fiber. This example includes a control unit that produces the respective control signals to the fiber squeezers, respectively, and controls the fiber squeezers to produce either two or more different degrees of squeezing or to squeeze at two or more different selected squeezing frequencies.

In another aspect, an example for a method for scrambling light in different optical waveguide modes in a multimode optical fiber includes providing a multimode fiber that supports light in two or more different optical waveguide modes; engaging fiber squeezers to the multimode fiber at different locations along a lengthwise direction of the multimode fiber to squeeze the multimode fiber along two or more different squeezing directions perpendicular to the lengthwise direction; and controlling the fiber squeezers to modulate a degree of squeezing at selected squeezing frequencies, respectively, to cause mixing of light in the two or more optical waveguide modes inside the multimode fiber to increase a spatial uniformity of optical power across a cross section of the multimode fiber.

In yet another aspect, an example for a multimode optical fiber device includes a linear actuator responsive to a control signal to cause a dimensional change along a straight line; and a fiber stretcher frame comprising at least one expandable slot that is engaged to the actuator so that the dimensional change along the straight line is across the expandable slot to change a width of the expandable slot. The fiber stretcher frame is structured to amplify the dimensional change of the actuator to produce an amplified change in a circumference of an exterior surface of the fiber stretcher frame. This example includes a multimode fiber that supports light in two or more optical waveguide modes and wraps around the exterior surface of the fiber stretcher frame to form a fiber loop; and a control unit that produces a control signal to the linear actuator and controls the linear actuator to modulate a degree of stretching of the fiber loop at a selected frequency to cause mixing of light in the two or more optical waveguide modes inside the multimode fiber to increase a spatial uniformity of optical power across a cross section of the multimode fiber.

In yet another aspect, an example for a method for scrambling light in different optical waveguide modes in a multimode optical fiber includes providing a multimode fiber that supports light in two or more different optical waveguide modes; and modulating a dimension of at least one linear transducer to cause spatial disturbances at multiple locations in the multimode fiber to cause mixing of light in the two or more optical waveguide modes inside the multimode fiber to increase a spatial uniformity of optical power across a cross section of the multimode fiber.

These and other examples and implementations are described in detail in the drawings, the detailed description and the claims.

BRIEF DESCRIPTION OF THE DRAWINGS

FIGS. 10A and 10B show one exemplary design a fiber stretcher device using multiple actuators arranged in a radial configuration to control a radial dimension of a stretcher frame.

DETAILED DESCRIPTION

A multimode fiber has a waveguide structure with a fiber core and a fiber cladding to support light in two or more different optical waveguide modes. The radial profile of the refractive index of the multimode fiber can be step-indexed to have a high-index fiber core and a low-index fiber cladding outside the fiber core, or be configured to have a graded index profile that decreases in value along the radial direction from the center of the fiber. Disturbance can be applied to different locations along the lengthwise direction of the multimode fiber to cause mixing of different modes. A proper disturbance can be implemented by modulating a dimension of at least one linear transducer to cause spatial disturbances at multiple locations in the multimode fiber to cause mixing of light in two or more optical waveguide modes inside the multimode fiber to increase a spatial uniformity of optical power across a cross section of the multimode fiber. The present mode scrambling techniques can be used with various multimode fibers without requiring special fibers or modification to fibers and thus are versatile. This mode scrambling can be implemented in various configurations.

Figure 1:
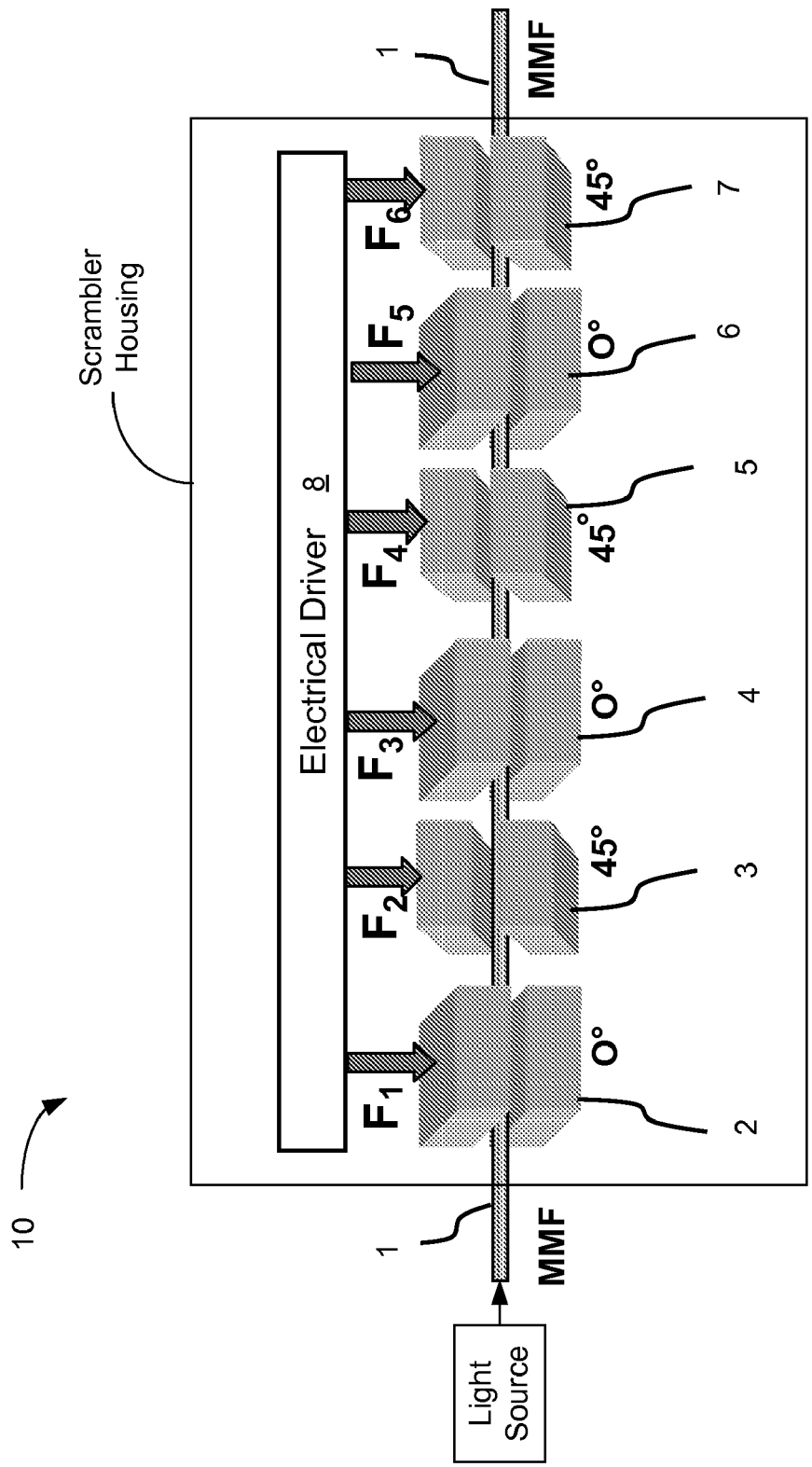
FIGS. 1 and 2 show two examples of multimode fiber mode scramblers.

FIG. 1 illustrates one example of a multimode fiber mode scrambler 10 based on the above scrambling mechanism. A multimode fiber (MMF) 1 is provided to guide light in two or more waveguide modes supported by the MMF 1. A light source, such as a laser or an LED, can be used to produce the light which is coupled into the MMF 1. Multiple fiber squeezers 2, 3, 4, 5, 6 and 6 are engaged to the MMF1 at different locations along a lengthwise direction of the MMF 1 to squeeze the MMF1 along two or more different squeezing directions perpendicular to the lengthwise direction. This squeezing at different locations along the MMF 1 causes spatial disturbances to the optical modes which, in turn, cause mixing of light in the different modes at these different locations. The mode mixing increases the spatial uniformity of optical power across the cross section of the MMF 1.

At least two fiber squeezers are needed and four or more fiber squeezers are preferred to produce sufficient mode mixing based on tests. Each fiber squeezer can include a linear actuator or transducer to cause a motion that squeezes the MMF 1. Piezo-electric transducers can be used. Two adjacent fiber squeezers, e.g., 3 and 4, can be oriented to squeeze along two different directions. In the illustrated example, the squeezing directions of two adjacent fiber squeezers are at 45 degrees with respect to each other. The fiber squeezers are responsive to respective control signals to modulate a degree of squeezing at selected squeezing frequencies, respectively. Two different fiber squeezers can be controlled to produce different squeezing on the MMF 1 in terms of the degree of the squeezing or squeezing amplitude, the squeezing frequencies, and a combination of both.

A control unit 8 is provided to include an electrical deriver that produces the respective control signals F1 through F 6 to the fiber squeezers, respectively. The control unit 8 controls the fiber squeezers to produce either two or more different degrees of squeezing or to squeeze at two or more different selected squeezing frequencies. Each control signal can be an oscillating signal oscillating at a selected squeezing frequency for the respective fiber squeezer. For example, a control signal can be a square wave signal or a sinusoidal wave signal. The squeezing frequency can be from 100 Hz to 10000 Hz and can be from 1000 Hz to 10000 Hz to provide sufficient mode mixing in some applications. A housing can be provided to enclose the fiber squeezers 2-7 and the control unit 8.

Figure 2:
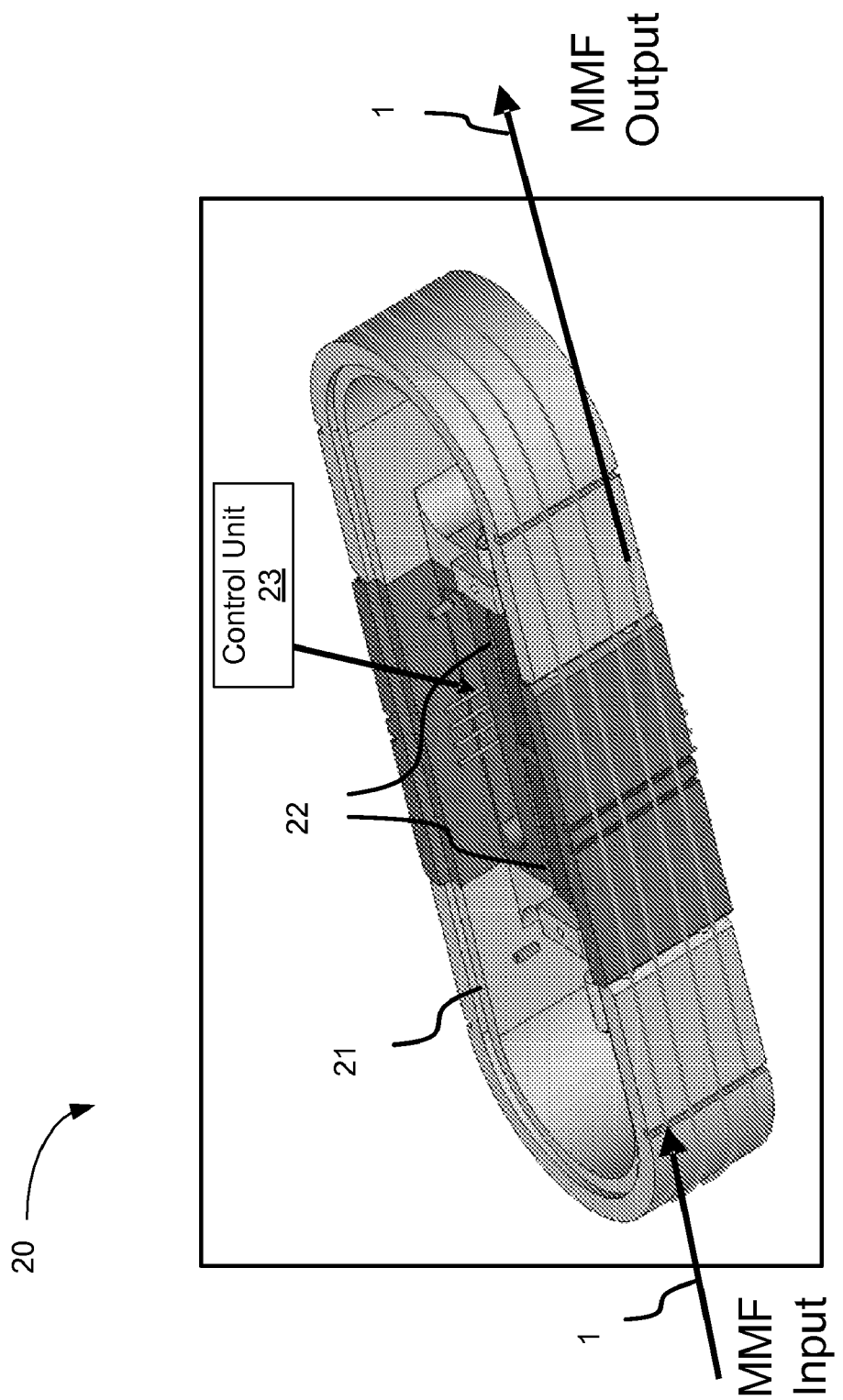

FIG. 2 shows another example of a multimode fiber mode scrambler 20 based on a fiber stretcher frame 21. The fiber stretch frame 21 is structured and engaged to one or more linear piezo-electric actuators 22 cause fiber stretcher 21 to change its dimension to provide the longitude extension at a selected modulation frequency (typically several KHz), therefore, generating spatial mode scrambling along the multimode fiber.

The fiber stretcher frame 21 can be structured to include at least one expandable slot that is engaged to the actuators 22 so that the dimensional change along the straight line is across the expandable slot to change a width of the expandable slot. The fiber stretcher frame 21 is structured to amplify the dimensional change of the actuator 22 to produce an amplified change in a circumference of an exterior surface of the fiber stretcher frame 21. The MMF 1 that supports light in two or more optical waveguide modes wraps around the exterior surface of the fiber stretcher frame 21 to form a fiber loop. A control unit 23 is provided to produce a control signal to the linear actuator 22 and controls the linear actuator 22 to modulate a degree of stretching of the fiber loop at a selected frequency to cause mode mixing. Different from the device in FIG. 1 which causes disturbances at different location son the MMF 1, the fiber stretcher frame 21 in FIG. 2 causes longitudinal disturbances to MMF 1 at all locations in the portion wrapped on the frame 21 to cause the mode mixing.

Figure 3:
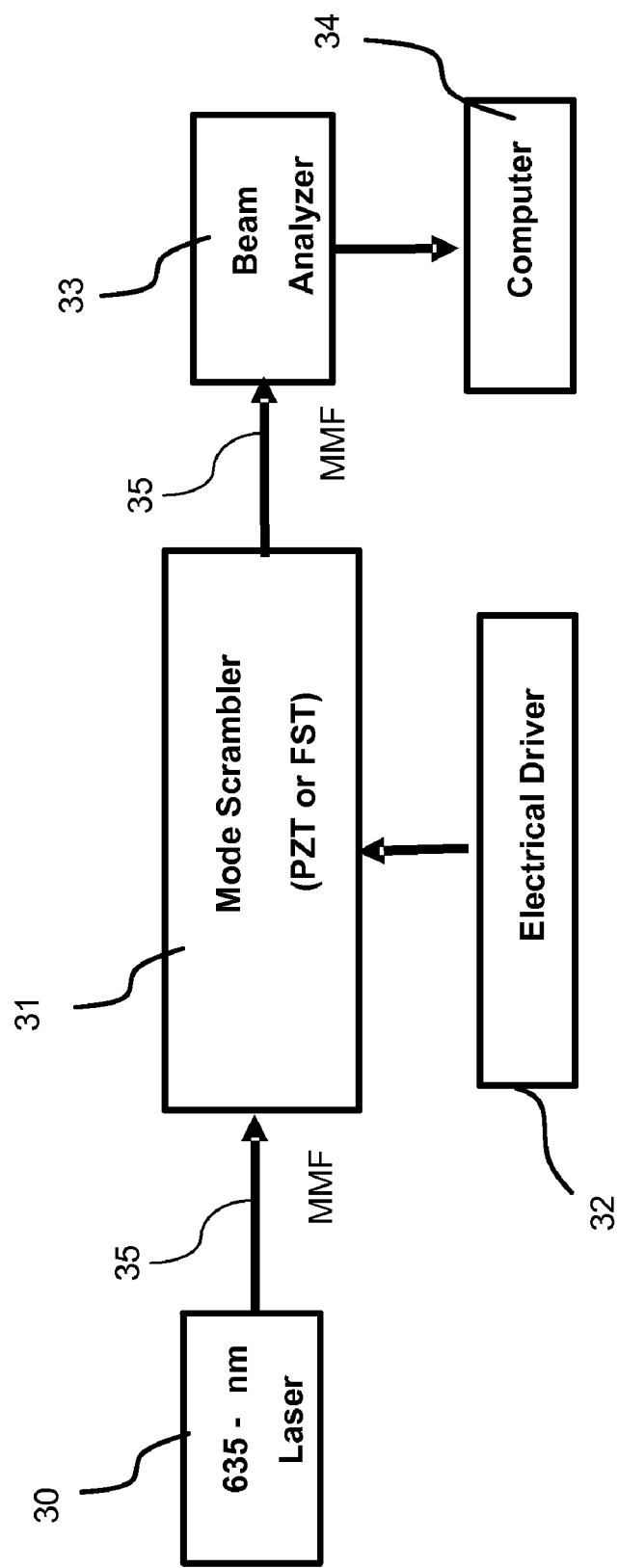
FIG. 3 shows a testing system for measuring performance of a multimode fiber mode scrambler.

FIG. 3 shows a system for evaluating the performance of a multimode fiber mode scrambler 31 based on various designs in this application including the designs in FIGS. 1 and 2. A laser 30, such as a laser at 635 nm, is used to produce light into a test MMF 35 to which the scrambler 31 is engaged. A beam analyzer 33 is used to detect the output light in the MMF downstream from the scrambler 31 under test. A control unit 32 with the electrical driver for the scrambler 31 is used to control the operation of the scrambler 31. Electrical signals are generated by the control unit 32 and applied on the piezo-driver (generating up to 150-V driving voltages on the piezos with a certain frequencies) in the scrambler 31 to provide either fiber squeezing or stretching effect (six driving signals for the squeezing technology and four signals for the fiber stretching approach). The final beam profile of the output beam from the scrambler 31 in the MMF 35 is recorded in the computer 34.

Figure 4A:
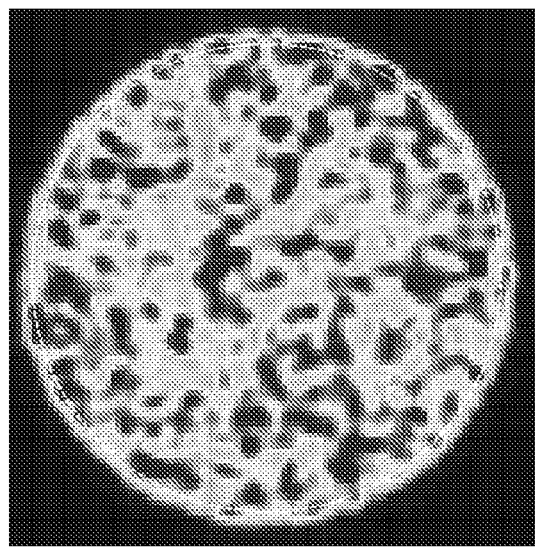
FIGS. 4A, 4B and 4C show examples of measured beam patterns using the system in FIG. 3.
Figure 4B:
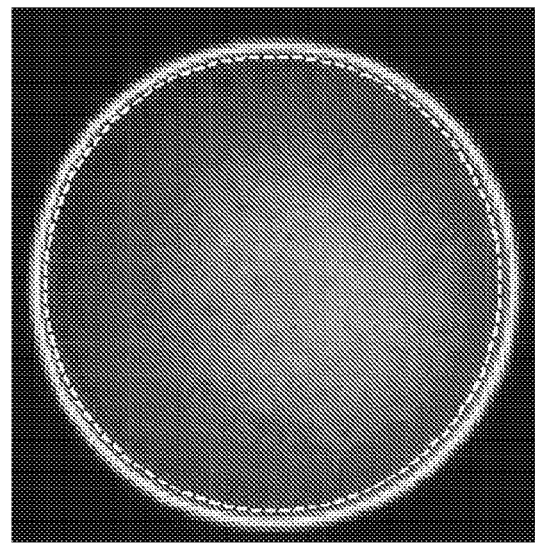
Figure 4C:
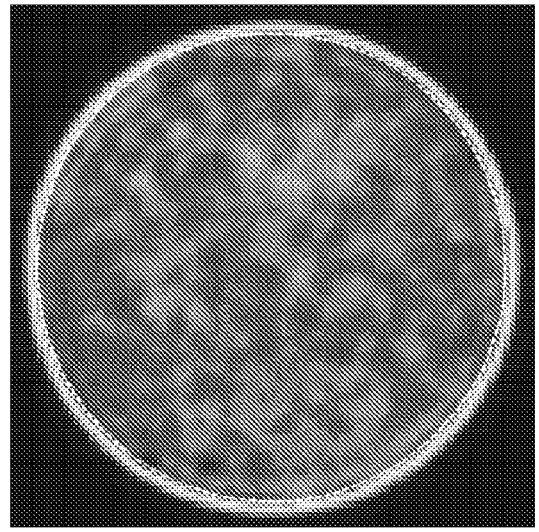

FIGS. 4A, 4B and 4C show beam profiles in conducted tests. FIG. 4A is the beam profile of the light in the MMF 35 without mode scrambling and exhibits significant spatial features in the spatial distribution of the optical power. FIG. 4B shows the beam profile of the output beam from a scrambler based on the design in FIG. 2. FIG. 4C shows the beam profile of the output beam from a scrambler based on the design in FIG. 1. In both cases, the beam uniformity is significantly improved.

The following sections describe examples of specific implementations of the devices in FIGS. 1 and 2.

Figure 5:
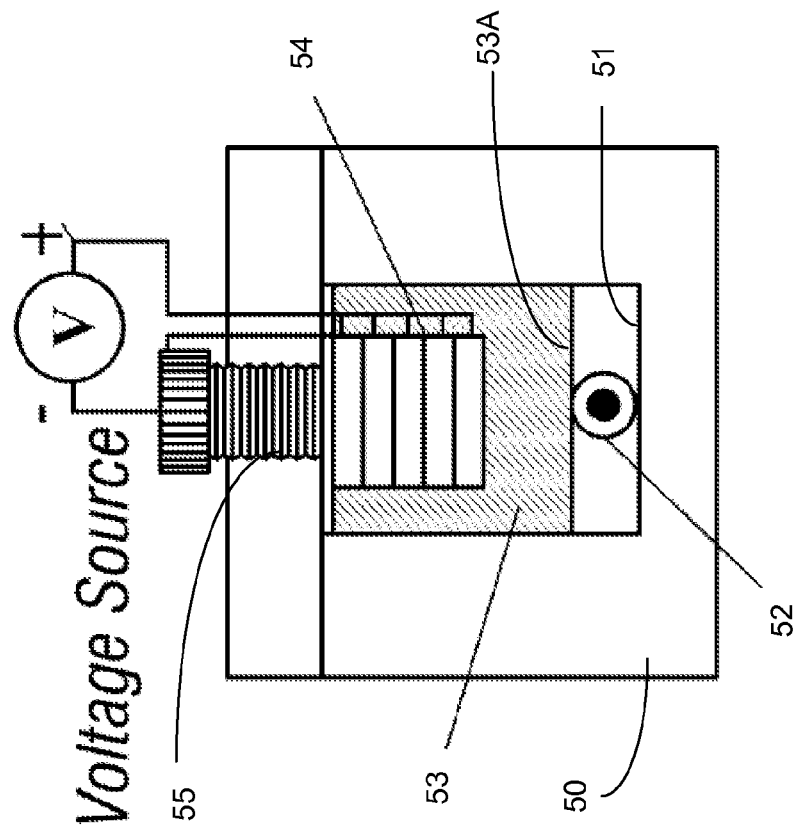
FIG. 5 shows an example of a piezo-electric fiber squeezer.

FIG. 5 shows a cross section view of a fiber squeezer that can be used to implement the fiber squeezers in FIG. 1. A fiber holder 50 includes a smooth flat surface 51 that supports a first side of a MMF 52 which may be coated with a polyimide coating surrounding the fiber cladding. A pressure block 53 including a second smooth surface 53A presses against an opposite side of the MMF 52 to squeeze the MMF 52 by changing the position of the pressure block 52 with respect to the fiber holder 50. A linear actuator 54, such as a PZT stack, is engaged to the pressure block 53 to change the position of the pressure block 54 in response to a control signal from a driver circuit 304 as part of the control unit for the scrambler. The PZT transducer can be a stack of piezo electric elements. Altering the voltage applied across the stack changes the displacement of stack. The applied voltage is an oscillating voltage signal at a selected squeezing frequency, e.g., several KHz. A screw 55 is provided to set the initial position of the pressure block 53.

One difficulty with piezo electric elements is that significant voltages are typically needed to achieve the desired displacement. Often the voltage requirements may exceed 50 volts. Generating such relatively high voltages in solid state systems involves transformers and powerful power supplies. To avoid such high voltages, the driving frequency of voltage source can be at the resonant frequency of piezo electric stack to reduce the voltage needed for the sufficient squeezing. It has been found that by driving the piezoelectrics at a resonant frequency, the minimum driving voltages can be reduced to below 10 volts and even below 2 volts. These low voltage makes it possible to drive the piezo-electric stack using low cost commercially available integrated circuits.

Different fiber squeezers may be structured to have different resonance frequencies to be operated at different squeezing frequencies in resonance. This design can improve the mode scrambling in the MMF.

Various tests indicate that the contact surfaces 53A and the 51 should be smooth to reduce optical loss in the MMF 52. Various fiber squeezing surfaces are designed to have surface protrusions and indentations that deviate from a plane of a smooth surface. Such surface irregularities, and particularly the protrusions, are largely responsible for the activation losses when squeezing surface presses against the fiber. In particular, the protrusions produce microbending in the fiber surface that results in light loss. In order to reduce microbending effects, the fiber squeezing surface can be treated by one of several techniques to generate a "super smooth" surface. One method of generating such a technique is by superpolishing. Typically such a superpolish is accomplished using a fine grade lapping film or polishing compound made of abrasive particles. Such particles may include diamond, silicon carbide, or aluminum oxide. Alternative methods of superpolishing a surface are also available. For example, an electro-polish technique may be used to obtain mirror-type finished metal surfaces. Yet another method of treating the surface of the fiber squeezer is to use adhesives or similar chemicals to fill in the cracks on the surface. When cured, the adhesive forms a smooth hard coating and thus reduces the roughness of the surface. Such lapping films or compounds are traditionally used to polish mirrors, lenses, and fine finish metals to create a super smooth surface.

The superpolish reduces the height of the highest protrusion to less than 100 microns and preferably to a height of less than 50 microns. Thus when the super polished fiber squeezing surface is pressed against the fiber, the "roughness" or maximum deformation of the fiber surface from the smooth surface is less than 100 microns. By reducing protrusions to less than 100 microns or 0.1 mm, activation losses can be reduced to 0.01 dB. Further polishing can further reduce activation losses. In the laboratory, super polishing has reduced activation losses below 0.002 dB.

Fibers including MMF can include microcracks the surface of the fiber cladding and these cracks can cause fiber breakage under stress. In particular, when pressure induced fiber stress occurs, fiber breakage starts from one or more microcracks and propagates across a fiber cross section. In order to strengthen the fiber, a polyimide coating can be applied around the fiber cladding. Alternatively, other chemical coatings may also applied to the fiber surface to seal the microcracks and increase fiber's strength. Such coating materials include chlorinated polydimethylsiloxane, monometric octadecylsilane, β-chloroethylsilsesquioxane, and methylsilsesquioxane. The coating thickness can range from nanometers to 10 microns. Coating uniformity is important because coating non-uniformity induces microbending in the fiber resulting in high activation losses. A few molecular layer of carbon around the fiber cladding may further increase the fiber durability under stress. A typical thickness of the poly-imide coating is between 10 and 25 micrometers. Such polyimide coated fibers are commercially available from Lucent Technologies of Avon, Conn. and sold under the trade name PYROCOAT. These polyimide coated fibers are typically sold for high temperature applications.

Referring to FIG. 2, the fiber stretcher frame 21 can be implemented in various configurations. Several examples are described below.

Figure 6:
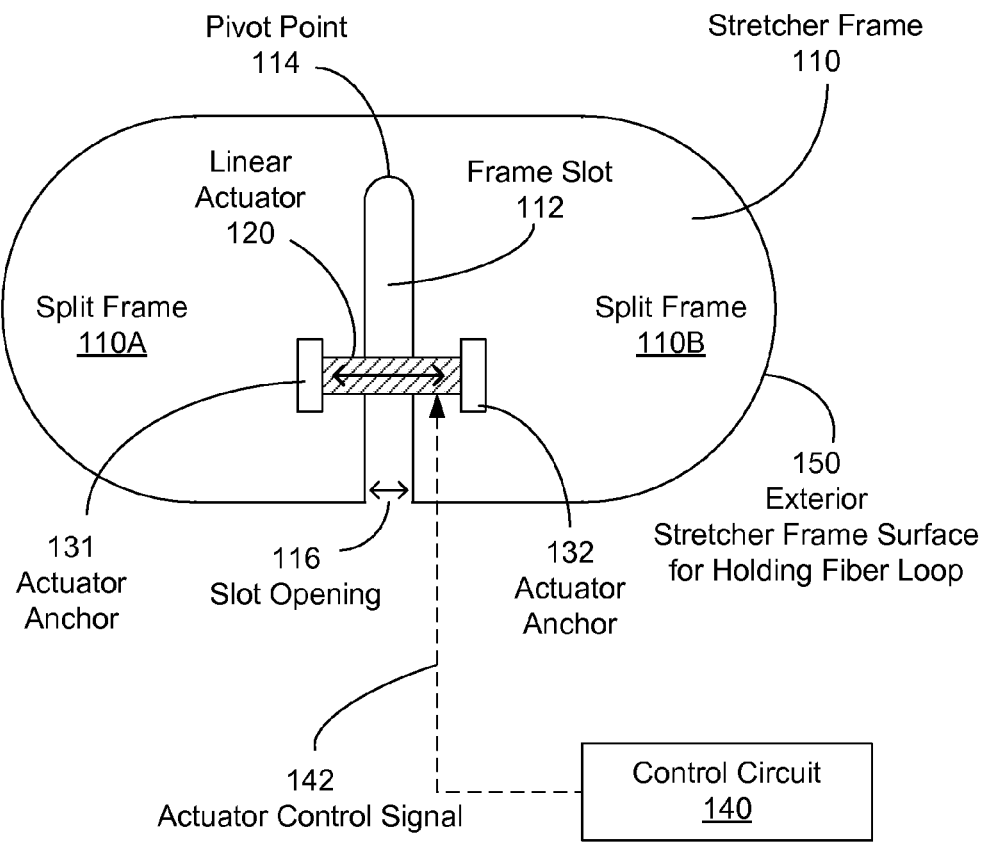
FIG. 6 shows one exemplary design of a fiber stretcher device using an actuator to control a dimension of an expandable slot in a stretcher frame.
Figure 6:
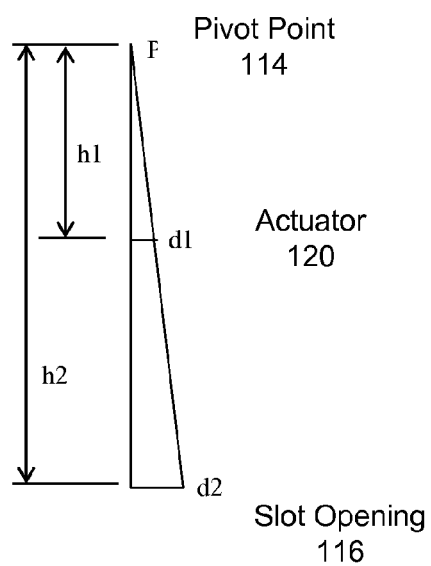

FIG. 6 shows one exemplary design of a fiber stretcher device using an electrically controlled actuator to control a dimension of a slot in a stretcher frame. The illustrated fiber stretcher device includes a stretcher frame 110 that has a frame slot 112 with a slot opening 116 at one end to separate the frame 110 into two parts 110A and 110B that are connected at the other end 114 of the frame slot 112. The frame slot 112 can be centered in the frame 110 to make two equal frame parts 110A and 110B or positioned to make frame parts 110A and 110B different in size and shape A linear actuator 120, which expands or contracts along a straight line in response to a control signal to produce a linear change in the dimension of the actuator along the straight line, can be positioned across the frame slot 112 with one end fixed to one frame part 110A and the other end fixed to the other frame part 110B. The linear expansion or contraction of the linear actuator 120 exerts a force across the frame slot 112 on the two frame parts 110A and 110B to cause them to pivot relative to each other around the connected end 114 of the frame slot 112. As the dimension of the actuator 120 changes, the change forces the separation of the two frame parts 110A and 110B on two opposite sides of the frame slot 112 to change accordingly. Therefore, the frame slot 112 is an expandable slot and acts like a spring. Notably, this design transforms a linear expansion or contraction of the actuator 120 into a change in the circumferential length of the stretch frame 110 which can be shaped in various shapes. This mechanism can be used to stretch a fiber loop formed by winding optical fiber around the exterior surface 150 of the stretcher frame 110 multiple times under tension. The exterior of the stretcher frame 110 can be configured to various shapes, e.g., having smooth curves on the exterior surface 150 for holding a fiber loop. Examples of the exterior surface include circles, ellipses, squares with round corners, rectangles with round corners, and racetrack shapes.

Therefore, this and other stretcher frame designs based on the present disclosure allow one or more linear actuators to be used to control a change in the circumferential length of a frame for stretching fibers without using cylindrical PZT actuators. Linear actuators, such as linear PZT actuators, are commercially available in large quantities and at relative low cost and can be easily packaged or integrated in various configurations to provide design flexibility in fiber stretchers based on the disclosure of this application. For example, because each linear PZT actuator has a limited expansion and contraction range, two or more PZT linear actuators can concatenate together as a combined actuator to increase the total expansion and contraction range of the combined actuator. Cylindrical PZT actuators tend to have small circumferences and thus have limited expansion and contraction ranges. It is difficult to combine two or more cylindrical PZT actuators to produce a larger circumferential change beyond the rang of each individual cylindrical PZT actuator. The stretcher frame designs that use one or more linear actuators can be structured to amplify the expansion and contraction ranges of the one or more linear actuators to produce large circumferential changes on the frames. This combination of transformation of a linear expansion or contraction of one or more linear actuators into a circumferential expansion or contraction of a fiber stretcher frame and the amplification of the linear expansion or contraction of one or more linear actuators can be advantageously used in various fiber stretcher frames.

Referring back to FIG. 6, the stretcher frame 110 can be made from various materials. For example, the frame 110 can be machined with a single piece of a solid material, such as a metal (e.g., aluminum or copper), an alloy (e.g., stainless steel), and a synthetic material (e.g., plastics). The slot 112 can be machined by milling, sawing, electro wire-cutting, or other process to create the slot opening 116 at the one end. The thickness of the attachment at the other end 114, which is the pivot point, depends on the material to be used and may be, e.g., from 0.1 mm to 10 mm. For better mechanical performance, a circular shape is formed around the pivot point 114 by drilling or other process. Alternatively, the slot 112 can be cut all the way through the completely separate the frame 110 into two separated frame parts 110A and 110B and a binder component can be used to connect the two frame parts 110A and 110B to form the pivot point 114. For example, a metal sheet between 0.01 mm to 10 mm can be used to bind two parts 110A and 110B together and act as a spring.

Two anchors 131 and 132 are formed on two frame parts 110A and 110B for engaging the two ends of the actuator 120, respectively. The actuator 120 is designed to change its dimension along the linear direction defined by the two anchors 131 and 132. The actuator 120 is a linear actuator that expands or contracts along one linear direction. The linear actuator 120 can be in various configurations, such as a piezoelectric actuator, an electro-strictive actuator, a magneto-strictive actuator, a magneto-mechanical actuator, and a linear motor actuator. A control circuit 140 is provided to control the operation of the actuator 120 by producing an actuator control signal 142 to drive the actuator 120. This control signal 142 can be electrical (e.g., when an PZT actuator is used) or magnetic (e.g., when a magneto-strictive actuator is used). The linear actuator 120 can be a combination of two or more concatenated linear actuators that are connected in series.

The arrangement in FIG. 1 provides an amplification mechanism to amplify the displacement produced by the actuator 120. Referring to the insert illustration in FIG. 1, the amount of the change in spacing at the slot opening 116 varies with the position of the actuator 120 along the frame slot 112 between the pivot point 114 and the slot opening 116. Assuming the actuator 120 is at a position is away from the pivot point 114 by h1 and the spacing between the pivot point and the slot opening 116 is h2, a spacing d1 of the frame slot 112 at the actuator 120 corresponds to a greater spacing d2 at the slot opening 116: d2/d1=h2/h1. Therefore, the smaller the h1 (i.e., the closer the actuator 120 is placed to the pivot point 114 is), the bigger the spacing d2 at the slot opening 116, provided that the actuator 120 can generate a sufficient force to overcome the counter force of the stretcher frame 110 and the stretched fiber around the stretcher frame 110. When the actuator 120 is placed at the center, the amount of amplification is 2.

The spacing between the actuator anchors 131 and 132 is designed to apply a preload on the linear actuator 120 and to apply an initial stretch on the fiber loop on the stretcher frame 110. This fiber initial stretch condition on the fiber loop allows the fiber frame 110 to decrease or increase the amount of stretch on the fiber loop as the linear actuator 120 contracts or expands. This initial fiber stretch condition can be achieved via various designs. In one design, for example, at least one screw can be mounted on one actuator anchor 131 or 132 to press against and hold one end of the linear actuator 120. This screw can be turned to press the linear actuator 120 and to expand the frame slot 112 so as to produce a desired slot opening 116 for the initial stretch condition on the fiber loop. In another design, one actuator anchor 131 or 132 may be an adjustable anchor that is movably engaged to frame 110 and can be moved in position relative to the other actuator anchor to adjust the spacing between the two actuator anchors 131 and 132 to achieve the above initial fiber stretch condition.

Figure 7A:
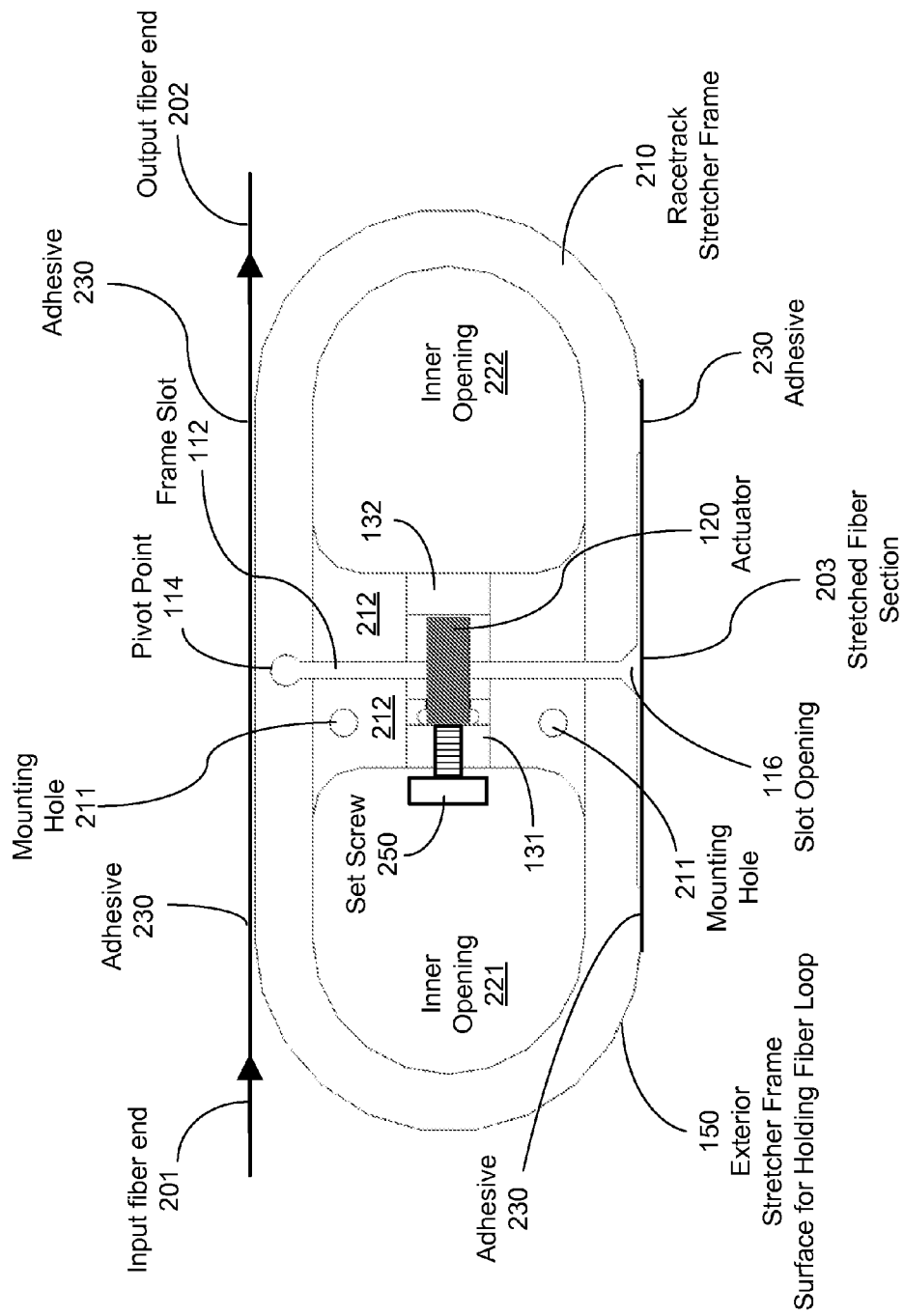
FIGS. 7A and 7B show one implementation of the design in FIG. 1 using a PZT linear actuator.
Figure 7B:
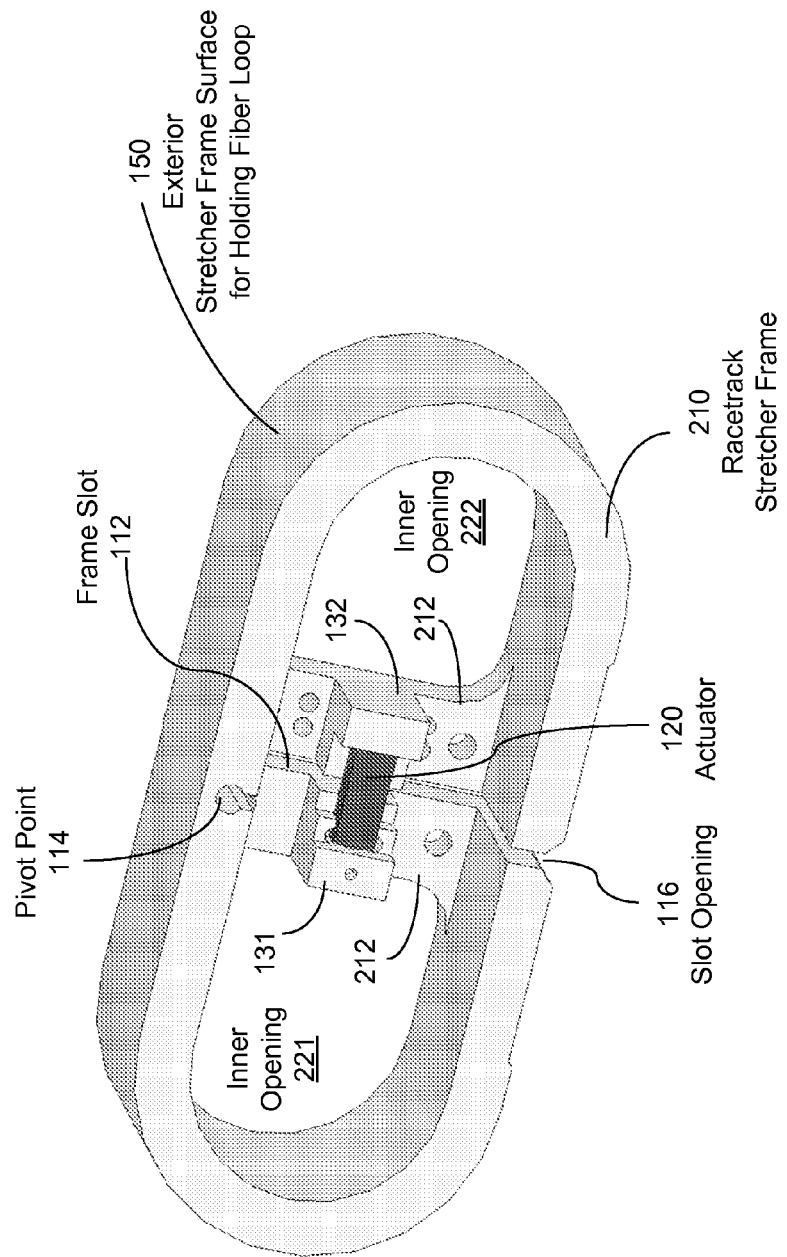

FIGS. 7A and 7B show one implementation of the design in FIG. 6 using a PZT linear actuator. In this design, a racetrack shaped stretcher frame 210 is used to support a smoothly curved exterior surface 150 for holding a fiber loop with an input fiber end 201 and an output fiber end 202. Interior portions of the stretcher frame 210 are removed to form inner openings 221 and 222 to reduce the overall weight while maintaining an interior portion 212 in the center of the frame 210. The frame slot 112 is formed in the interior portion 212 to split the frame 210 into two parts. The two anchors 131 and 132 are formed in the interior portion 212 for engaging the actuator 120 across the frame slot 112. The two anchors 131 and 132 may be shaped from the interior portion 212 as an integral part as shown in FIG. 7B or separate anchor components that are engaged to the interior portion 212. Mounting holes 211 can be formed in the interior portion 212 of the stretcher frame 210 for mounting the device to a support structure.

In this example, the actuator 120 is implemented as a linear piezo-electric actuator made from multiple PZT cells stacked together to achieve a relatively high expansion coefficient and can operate at a relatively low voltage for each PZT cell. For example, a PZT actuator with a total length of 10 mm, a total expansion of more than 10 microns may be achieved with a voltage of 150 volts. Such PZT actuators can be made at a relatively low cost because they are widely used and are commercially available in large quantities. Some commercial actuators are in a linear form with small sizes, with a length around a centimeter and a cross section of a few millimeters. As such, the cross section of these commercial PZT actuators is too small to wind fiber loops as fiber stretchers. The stretcher frame 210 shown in FIG. 7A and stretcher frames in other designs in this application can amplify the displacements of such linear PZT actuators to achieve sufficiently large fiber stretching for various optical delay applications including fast variable delay applications.

In this example, a set screw 250 is mounted on the anchor 131 and is pressed against to one end of the liner actuator 120 whose the other end is fixed to the anchor 132. The set screw 250 is turned to push the linear actuator 120 to expand the width of the frame slot 112 to set the fiber stretcher into an initial default stretch condition where a fixed tension is generated by the stretcher frame 210 on the fiber. This set screen 250 can also apply and adjust a pre-load force to the linear PZT actuator 120. The proper amount of pre-load force to the piezo actuator 120 can affect the performance and operation of the actuator 120. to have optimum piezo actuator performance. When the actuator control signal, such as a voltage, is applied to the actuator 120, the actuator 120 expands or contracts to cause the fiber loop wrapped around the race-track stretcher frame 210 to expand or shrink, and thus causing the optical delay to change.

Stretching can induce optical birefringence in the fiber and this induced birefringence can change the optical polarization of the light. To minimize a change in light polarization of the signal passing through the fiber loop in the fiber stretcher, adhesive 230 can be applied at the end of each straight part of the racetrack stretcher frame 210 to affix the fibers to the mechanical structure so that only a straight fiber section on the stretcher frame 210 undergoes expansion or contraction as the linear actuator 120 expands or contracts while a fiber section that is curved is isolated from the expansion or contraction. The stretching of a straight fiber section does not change the orientation of each principal axis of the fiber and thus does not change the light polarization. For example, adhesive 230 can be applied at four marked locations to fix the fiber as shown in FIG. 7A. This feature keeps curved or bended fiber portions under a fixed stretch and does not cause curved or bended fiber portions to expand or contract when the linear actuator 120 expands or contracts. The racetrack stretcher frame 210 in FIGS. 7A and 7B includes two parallel straight sections and the adhesive 230 is applied at two opposite ends of each straight section. Therefore, the fiber sections in the curved sections of the stretcher frame 210 are mechanically isolated from the stretching action caused by the linear actuator 120 and the action of the linear actuator 120 only applies to the straight section of the fibers to minimize the change in the optical polarization.

This and other fiber stretcher designs in this application that use a fiber stretcher frame to amplify the displacement of one or more linear PZT actuators can be implemented to allow for small linear PZT actuators with relatively low capacitances to be used to provide high speed tuning in optical delays at a relatively low operating voltage and low power consumption. Because mass-produced commercial PZT actuators can be used in the present designs, fiber stretchers can also be manufactured at a reasonable cost.

Figure 8A:
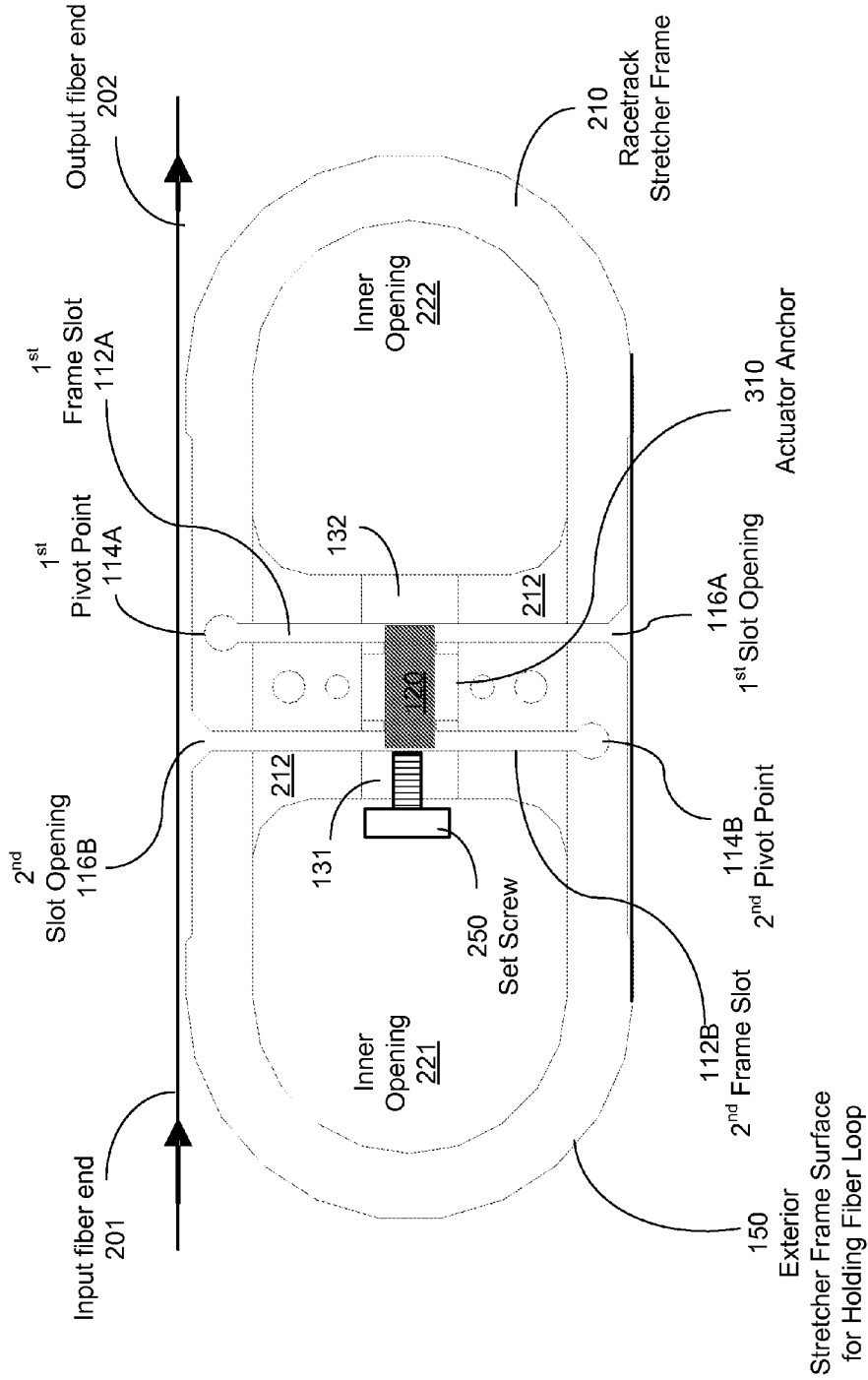
FIGS. 8A and 8B show one implementation of the design in FIG. 1 using a PZT linear actuator to control dimensions of two expandable slots in a stretcher frame.
Figure 8B:
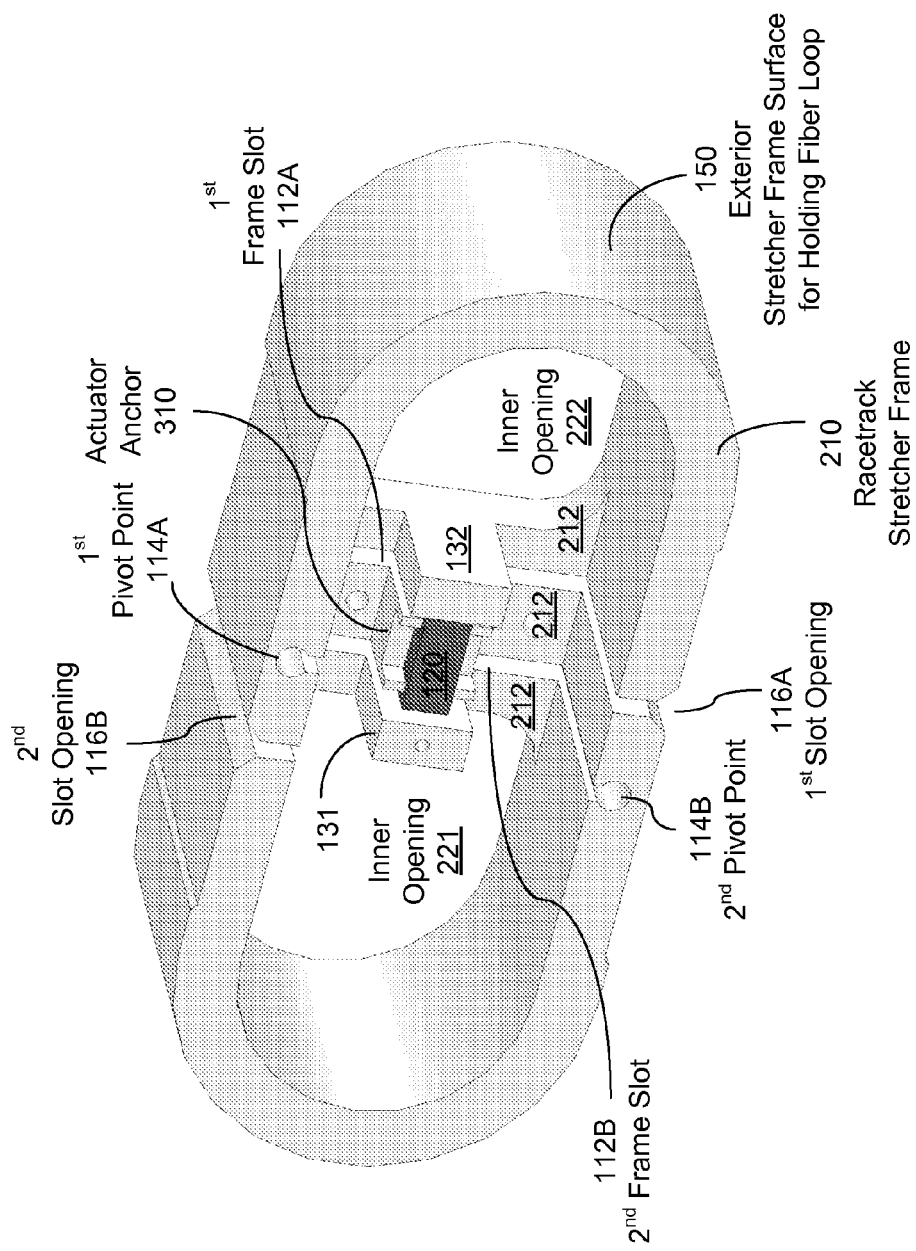

FIGS. 8A and 8B show one implementation of the design in FIG. 6 using a PZT linear actuator to control dimensions of two slots in a stretcher frame. The example for this implementation shown uses a racetrack geometry for the stretcher frame 210 similar to the geometry in FIGS. 7A and 7B. The interior portion 212 are structured to include two frame slots 112A and 112B. The first frame slot 112A has a first slot opening 116A at one end of the interior portion 212 and a first pivot point 114A at the other end of the interior portion 212. The second frame slot 112B has a second slot opening 116B at one end of the interior portion 212 and a first pivot point 114A at the other end of the interior portion 212. In this particular example, the two frame slots 112A and 112B are substantially parallel to each other and share a common actuator 120. The shared actuator 120 is engaged to across both frame slots 112A and 112B to control the slot openings 116A and 116B, respectively. The two expandable frame slots 112A and 112B divide the interior portion 212 into three sections having three actuator anchors 131, 310 and 132, respectively. The shared actuator 120 is mounted on the three actuator anchors 131, 310 and 132 to control the spacing of the first frame slot 112A based on the displacement of the actuator 120 between the anchors 310 and 132 and the spacing of the second frame slot 112B based on the displacement of the actuator 120 between the anchors 210 and 131. Therefore, the two expandable slots 112A and 112B allow fibers on both sides of the race-track to be stretched to increase the stretching range in comparison with the fiber stretcher device in FIGS. 7A and 7B with a single expandable frame slot 112.

Figure 9A:
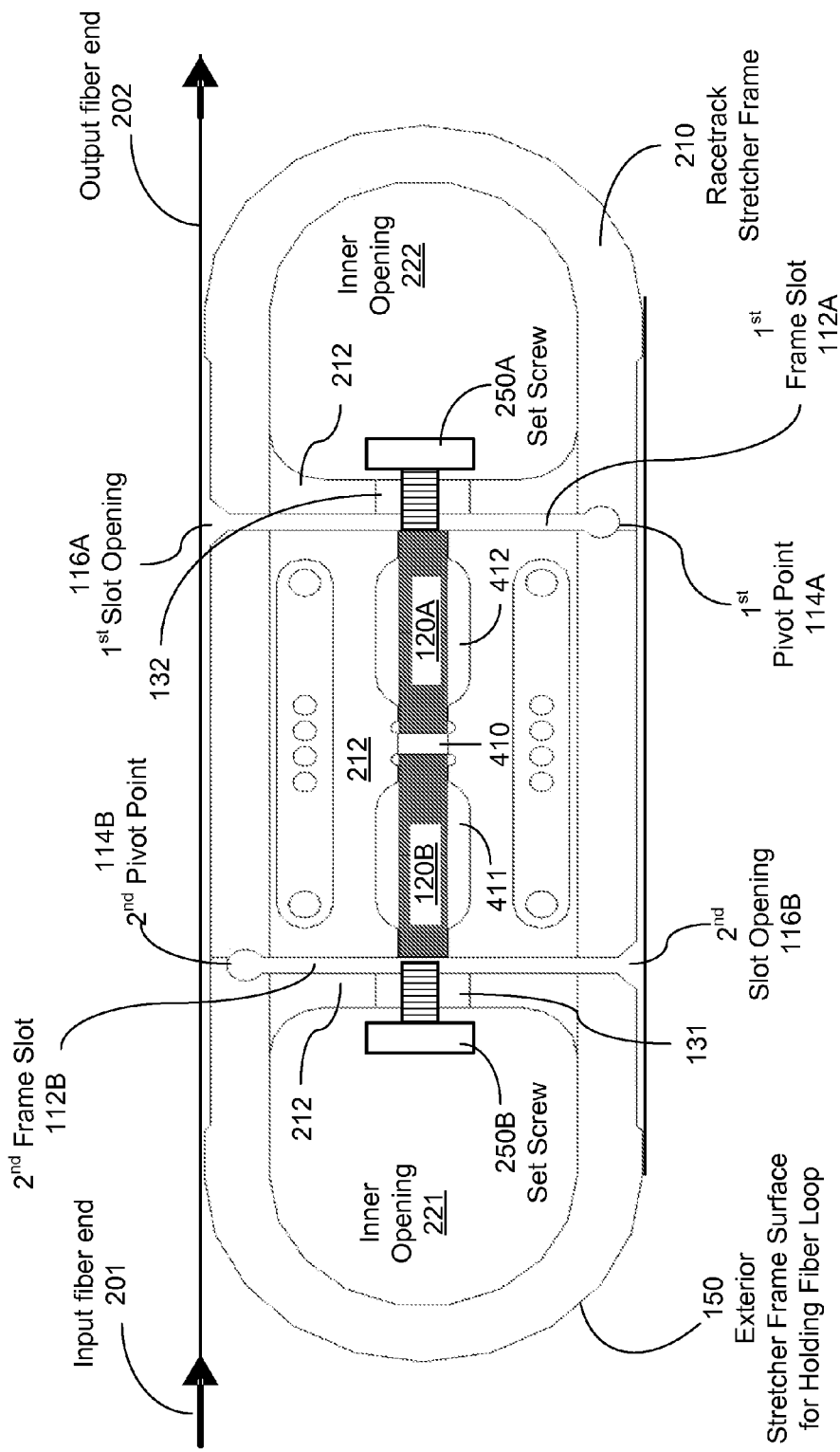
FIGS. 9A and 9B show one implementation of the design in FIG. 1 using two or more PZT linear actuators to control dimensions of two expandable slots in a stretcher frame.
Figure 9B:
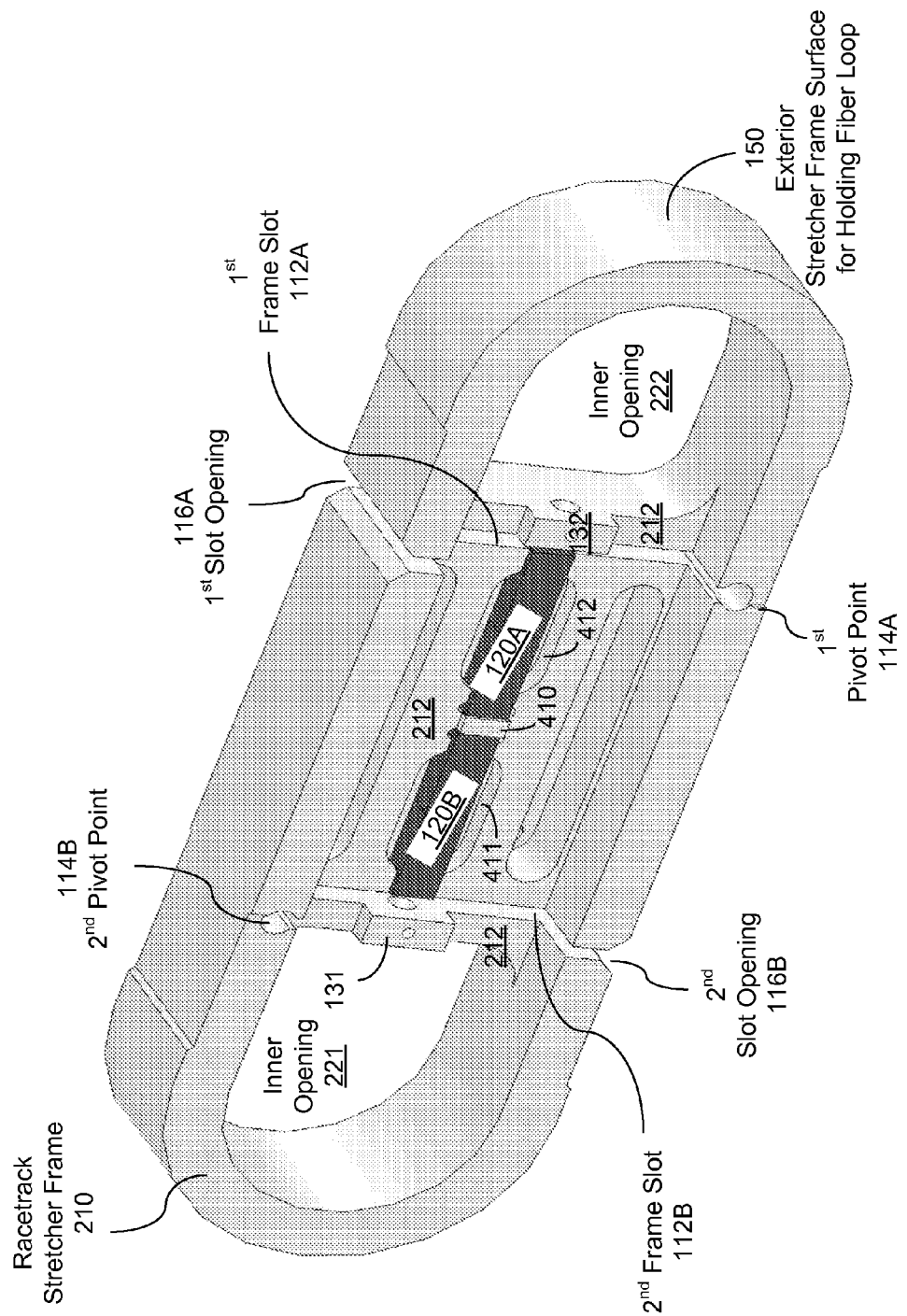

FIGS. 9A and 9B show one implementation of the design in FIG. 6 using two or more PZT linear actuators to control dimensions of two expandable slots in a stretcher frame. Two linear actuators 120A and 120B are cascaded in series by actuator anchors 131, 411, 410, 412 and 132 on the interior portion 212. The first linear actuator 120A is engaged to anchors 410, 412 and 132 to control the spacing of the first expandable frame slot 112A. A first set screw 250A is engaged to press the first actuator 120A to apply a preload. The second linear actuator 120B is engaged to anchors 410, 411 and 131 to control the spacing of the second expandable frame slot 112B. A second set screw 250B is engaged to press the second actuator 120A to apply a preload. The anchor 410 is shared by two actuators 120A and 120B. Alternatively, the two actuators 120A and 120B can be directly in contact with each other without the middle anchor 410.

FIGS. 10A and 10B show one exemplary design a fiber stretcher device using multiple linear actuators arranged in a radial configuration to control a radial dimension of a stretcher frame. In this example, the fiber stretcher frame includes an inner circular frame 510, and multiple exterior arc frames 520 circularly arranged around the inner circular frame 510 to form an outer circle concentric with the inner circular frame. Each exterior arc frame 520 is connected to the inner circular frame 510 via a connector 530 so that the inner circular frame 510, the connectors 530 and the exterior arc frames 520 for an integral structure. Each exterior arc frame 520 can be pulled outward along the radial direction by stretching the connector 530 by different amounts to change its radial position and to stretch the fiber loop on the exterior arc frames 520. The inner circular frame 510, the connectors 520 and the exterior arc frames 520 may be made from a metal or a non-metal material.

In this design, for each exterior arc frame 520, two linear actuators 520 are symmetrically positioned on opposite sides of the connector 530 and are engaged to the inner side of the exterior arc frame 520 and the outer surface of the inner circular frame 510. Each linear actuator 520 is oriented along the radial direction and to expand or contract along the radial direction. The linear actuators 520 are engaged to the inner circular frame 510 and arranged to form a circle concentric to the inner circular frame 510. The dimension and shape of the connector 530 are designed to allow for expansion and contraction along the radial direction to change the spacing between the exterior arc frame 520 and the inner circular frame 510 under action of the two actuators 520. The exterior surfaces 540 of the exterior arc frames 520 collectively form a circular exterior surface to hold the fiber loop.

Similar to other designs, the linear actuators 120 can be mounted to apply an initial stretch on the connectors 530 to create an initial fiber stretch condition. Set screws 250 can be installed on the inner circular frame 510 at locations of the linear actuators 120, respectively, to press each linear actuator 120 to stretch the connector 520 at a preload. A control circuit is used to apply control signals to all actuators 120 to expand or contract the fiber loop that is wrapped around the exterior arc frames 520. Each linear actuator 120 can be controlled separately for more flexibility in operation.

The fiber stretchers described in this application can be designed to set their resonant frequencies close to selected frequencies of interest. The resonant frequencies of such a fiber stretcher depend on a number of device parameters, including the mass of the mechanical structure, the actuator's capacitance, resistance, and resonant frequencies, the Young's modules of the fiber and the material of the mechanical structure, the number of turns of the fiber wound around the fiber stretcher, and the mounting mechanism.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A multimode optical fiber device, comprising:
   a multimode fiber that supports light in two or more optical waveguide modes;
   a plurality of fiber squeezers engaged to the multimode fiber at different locations along a lengthwise direction of the multimode fiber to squeeze the multimode fiber along two or more different squeezing directions perpendicular to the lengthwise direction, the fiber squeezers responsive to respective control signals to modulate a degree of squeezing at selected squeezing frequencies, respectively, to cause mixing of light in the two or more optical waveguide modes inside the multimode fiber to increase a spatial uniformity of optical power across a cross section of the multimode fiber; and
   a control unit that produces the respective control signals to the fiber squeezers, respectively, and controls the fiber squeezers to produce either two or more different degrees of squeezing or to squeeze at two or more different selected squeezing frequencies.

2. The device as in claim 1, wherein:
   each fiber squeezer comprises a piezo-electric transducer that responds to a respective control signal to squeeze the multimode fiber.

3. The device as in claim 2, wherein:
   wherein the piezo-electric transducer comprises a stack of piezo-electric elements.

4. The device as in claim 1, wherein:
   two adjacent fiber squeezers are oriented to squeeze the multimode fiber at two different squeezing directions.

5. The device as in claim 4, wherein:
   the two different squeezing directions of the two adjacent fiber squeezers are at 45 degrees to each other.

6. The device as in claim 1, wherein:
   each selected squeezing frequency ranges from 100 Hz to 10000 Hz.

7. The device as in claim 6, wherein:
   each selected squeezing frequency ranges from 1000 Hz to 10,000 Hz.

8. The device as in claim 1, wherein:
   the fiber squeezers are operated at different selected squeezing frequencies, respectively.

9. The device as in claim 1, wherein:
   a contact surface of each fiber squeezer in contact with the multimode fiber has a surface roughness less than 0.1 mm.

10. The device as in claim 1, wherein:
    the plurality of the fiber squeezers include at least four fiber squeezers.

11. A method for scrambling light in different optical waveguide modes in a multimode optical fiber, comprising:
    providing a multimode fiber that supports light in two or more different optical waveguide modes;
    engaging a plurality of fiber squeezers to the multimode fiber at different locations along a lengthwise direction of the multimode fiber to squeeze the multimode fiber along two or more different squeezing directions perpendicular to the lengthwise direction; and
    controlling the fiber squeezers to modulate a degree of squeezing at selected squeezing frequencies, respectively, to cause mixing of light in the two or more optical waveguide modes inside the multimode fiber to increase a spatial uniformity of optical power across a cross section of the multimode fiber.

12. The method as in claim 11, comprising:
    controlling the fiber squeezers to produce either two or more different degrees of squeezing or to squeeze at two or more different selected squeezing frequencies.

13. The method as in claim 11, comprising:
    orienting two adjacent fiber squeezers to squeeze the multimode fiber at two different squeezing directions.

14. A multimode optical fiber device, comprising:
    at least one linear actuator responsive to a control signal to cause a dimensional change along a straight line;
    a fiber stretcher frame comprising at least one expandable slot that is engaged to the actuator so that the dimensional change along the straight line is across the expandable slot to change a width of the expandable slot, the fiber stretcher frame structured to amplify the dimensional change of the actuator to produce an amplified change in a circumference of an exterior surface of the fiber stretcher frame;
    a multimode fiber that supports light in two or more optical waveguide modes and wraps around the exterior surface of the fiber stretcher frame to form a fiber loop; and
    a control unit that produces a control signal to the linear actuator and controls the linear actuator to modulate a degree of stretching of the fiber loop at a selected frequency to cause mixing of light in the two or more optical waveguide modes inside the multimode fiber to increase a spatial uniformity of optical power across a cross section of the multimode fiber.

15. The device as in claim 14, wherein:
    the linear actuator is a piezo-electric transducer that responds to the control signal to change a dimension.

16. The device as in claim 14, wherein:
    the fiber stretcher frame is partially divided into a first frame part and a second frame part by the expandable slot, wherein the first frame part and the second frame part are integral to each other and are connected at a pivot point around which the first and second frame parts move relative to each other under an operation of the actuator.

17. The device as in claim 16, comprising:
    a first actuator anchor on the first frame part to hold a first end of the actuator;
    a second actuator anchor on the second frame part to hold a second end of the actuator and spaced from the first actuator anchor to exert an initial load on the first and second frame parts to set an initial width of the expandable slot which produces an initial stretch on the fiber loop,
    wherein the actuator is operable to expand or contract to increase or decrease the initial stretch on the fiber loop, respectively.

18. The device as in claim 17, comprising:
    a screw mounted to the first actuator anchor and engaged to press against the first end of the actuator, the screw being adjustable to change a position of the actuator relative to the first actuator anchor to change the initial stretch.

19. A method for scrambling light in different optical waveguide modes in a multimode optical fiber, comprising:
providing a multimode fiber that supports light in two or more different optical waveguide modes; and
modulating a dimension of at least one linear transducer to cause spatial disturbances at multiple locations in the multimode fiber to cause mixing of light in the two or more optical waveguide modes inside the multimode fiber to increase a spatial uniformity of optical power across a cross section of the multimode fiber.

20. The method as in claim 19, comprising:
controlling the modulating the dimension of the at least one linear transducer at a modulation frequency from 100 Hz to 10000 Hz.

* * * * *

UNITED STATES PATENT AND TRADEMARK OFFICE
CERTIFICATE OF CORRECTION

PATENT NO. : 7,945,130 B2
APPLICATION NO. : 11/941007
DATED : May 17, 2011
INVENTOR(S) : Lianshan Yan et al.

It is certified that error appears in the above-identified patent and that said Letters Patent is hereby corrected as shown below:

In Column 3, Line 29, please delete "and 6" and insert -- and 7 --, therefor.

In Column 3, Line 53, please delete "deliver" and insert -- driver --, therefor.

In Column 3, Line 54, please delete "F 6" and insert -- F6 --, therefor.

In Column 4, Line 21, please delete "location son" and insert -- locations on --, therefor.

In Column 6, Line 23, please delete "shape A" and insert -- shape. A --, therefor.

In Column 6, Line 65, please delete "rang" and insert -- range --, therefor.

In Column 8, Line 59, please delete "120." and insert -- 120 --, therefor.

In Column 10, Line 59, please delete "modules" and insert -- modulus --, therefor.

Signed and Sealed this
Twelfth Day of July, 2011

David J. Kappos
*Director of the United States Patent and Trademark Office*